Oct. 13, 1964 R. B. POWER 3,152,926

PHOTOELECTRIC TRANSDUCER

Filed April 18, 1961

INVENTOR
Roy B. Power
BY
Eyre, Mann & Lucas
ATTORNEYS

United States Patent Office 3,152,926
Patented Oct. 13, 1964

3,152,926
PHOTOELECTRIC TRANSDUCER
Roy B. Power, Madison, N.J., assignor to Tung-Sol Electric Inc., a corporation of Delaware Filed Apr. 18, 1961, Ser. No. 103,753
3 Claims. (Cl. 136—89)

This invention relates to a photoelectric transducer for the conversion of light into electrical energy. It has particular reference to the efficient conversion of light, such as solar radiation, directly into electrical power by incidence upon a photoelectric cell.

Many types of photoelectric transducers have been developed and used for the detection of light, its measurement, and the conversion of light into electrical energy. The present invention is not concerned with the details of the transducer but rather in the manner of arrangement of the transducer components so as to absorb a greater portion of the light energy and reduce the percentage of reflected light. While the invention has been designed for use at locations exposed to light from the sun, the invention will be described without particular reference to the source of light energy. As used throughout the specification and claims, the term "light" refers to any type of photon energy, whether in the visible light range, the ultraviolet, or the infrared. The range of frequencies which can be usefully employed by the transducer depends only upon the range and sensitivity of the transducer material.

Briefly, the new photosensitive array comprises rows of parallel sided cell sections, adjacent sections forming therebetween a dihedral angle small enough to insure that incident radiation will successively impinge upon a plurality of surfaces thereby increasing absorption and reducing energy wasted by reflection from the array. The cell sections are connected together physically and electrically and each section includes a transparent conducting layer facing the light source, a metallic base layer, and a photosensitive material secured between the layers. Electrical conductors are connected to the transparent conductive layer and to the metallic base layer for transfer of the electrical energy to a load.

For a better understanding of the present invention, reference may be had to the following description taken in connection with the accompanying drawings.

Figure 1:
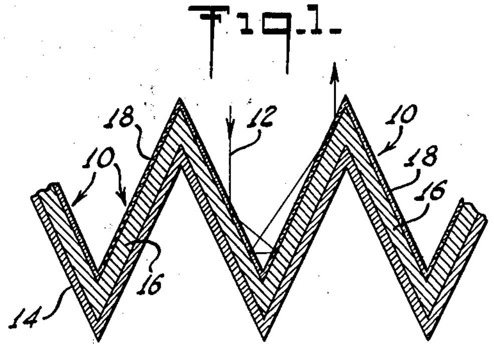
FIG. 1 is a cross sectional view of a transducer array representing one embodiment of the invention.

Referring now to FIG. 1, the transducer array is composed of a plurality of cell strips 10 mounted at an angle to each other of about 60°. This construction produces a symmetrical series of ridges with the acute dihedral angles therebetween such that a light ray 12 which is incident upon the transducer surface will be reflected at least three times before being directed back to the source. As energy is absorbed each time a direct or reflected ray strikes a cell section, the energy in the reflected ray progressively reduces and only a fraction of the energy of the incident ray is returned toward the source at the last reflection.

Each section has a metallic base 14, an intermediate layer 16 of photoelectric material, and an outer layer such as tin oxide 18 which must be both conductive and transparent. Layers 14 and 18 act as terminals for the transmission of electrical power and connections are made to these terminal layers for connection to a load which may be any type of utilization circuit. The photoelectric material 16 generates electric charge carriers when light is incident upon its outer surfaces. These charge carriers pass to layers 14 and 18 and thereby produce a potential which generates an electric current when connected to a load.

Figure 2:
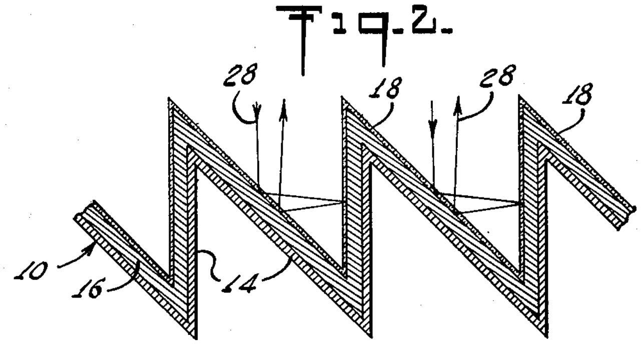

The transducer shown in FIG. 2 is similar to that shown in FIG. 1 except that alternate cell sections are vertical. The dihedral angle between the strips is about 45°. The number of reflections depends in part upon the direction of the incident light.

Figure 3:
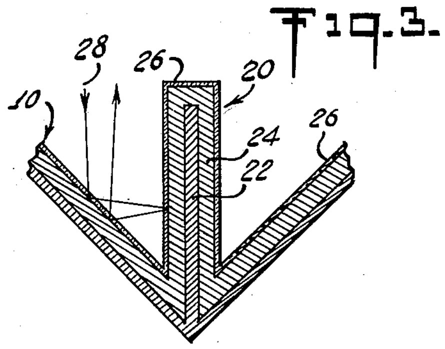
FIGS. 2 and 3 are cross sectional views of alternative forms of the transducer array.

In the transducer shown in FIG. 3 the strips 10 form a dihedral angle of 90° and an additional strip 20 is mounted in a vertical plane bisecting the angle between strips 10. The added strips 20 are secured to the troughs formed by the angle between strips 10 and extend above the level of the upper junctions of strips 10. Each includes a central conductive base strip 22, an intermediate layer 24, and an outer transparent conductive layer 26. These layers are joined to similar layers in the other strips as shown in FIG. 3. A light ray 28 incident upon one of the strips 10 is reflected to strip 20 and then back to strip 10 thereby making three reflections before leaving the array. It should be noted that one of these reflections is approximately at right angles to strip 20 and thereby is capable of greater conversion efficiency than reflections where the angle of incidence is much less.

Figure 4:
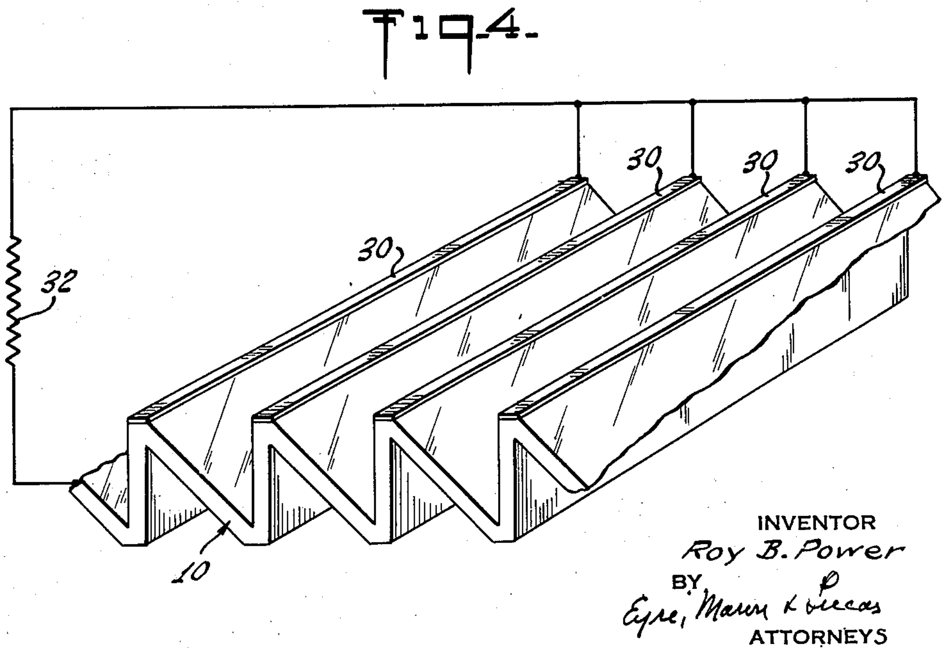
FIG. 4 is an isometric view showing the appearance of an array having a form generally similar to that of FIG. 2 and including additional terminal strips for the collection of electrical power.

The array shown in FIG. 4 is the same as that shown in FIG. 2 except that additional metallic conductive strips 30 have been added to the upper junctions of strips 10 and these and the lower junctions have been flattened. The strips 30 form additional terminals for connection to a load 32 and should be connected together as shown in that figure. These strips increase the conversion efficiency by lowering the overall cell resistance and permitting greater current to flow through the circuit.

It will be evident from the above description that a new array has been produced for photoelectric transducers which is more efficient than prior art transducers and in addition has lower internal resistance.

The foregoing disclosure and drawings are merely illustrative of the principles of this invention and are not to be interpreted in a limiting sense. The only limitations are to be determined from the scope of the appended claims.

I claim:

1. A photoelectric transducer comprising a metallic conductive base including a first series of strips connected to form a ridged surface, said surface including adjoining strips disposed at an angle of substantially 90° to each other, a second series of strips including a strip secured to each trough made by the strips of the first series, an intermediate layer of photoelectrical material secured to the top surface of said base and to both sides of each strip in said second series, and a top layer of transparent conductive material secured to the outer surface of said intermediate layer, said base and said top layer comprising electrodes for transmitting electrical energy to a load.

2. A photoelectric transducer as claimed in claim 1 wherein said second series of strips are mounted substantially at right angles to the common plane including the troughs.

3. A photoelectric transducer as claimed in claim 1 wherein the outer edges of said second series of strips extends beyond the plane defined by the upper edges of said first series of strips.

References Cited in the file of this patent

UNITED STATES PATENTS

| | | |
|---|---|---|
| 2,001,672 | Carpenter | May 14, 1935 |
| 2,214,283 | Norwood | Sept. 10, 1940 |
| 2,904,612 | Regnier | Sept. 15, 1959 |
| 2,919,298 | Regnier et al. | Dec. 29, 1959 |
| 2,989,641 | Nicoll | June 20, 1961 |
| 3,015,590 | Fuller | Jan. 5, 1962 |

FOREIGN PATENTS

| | | |
|---|---|---|
| 560,652 | Great Britain | Apr. 13, 1944 |
| 536,616 | Canada | Jan. 29, 1957 |

OTHER REFERENCES

Dale et al.: 14th Annual Power Sources Conference, May 17, 18, 19, 1960, "High Efficiency Solar Cells" (4 pages).

Acker et al.: Electronics, March 11, 1960 (pp. 167–172).